United States Patent
Watanabe (10) Patent No.: US 9,042,595 B2
(45) Date of Patent: May 26, 2015

(54) ANNOTATIVE INFORMATION APPLYING APPARATUS, ANNOTATIVE INFORMATION APPLYING METHOD, RECORDING MEDIUM, AND ELECTRONIC PROOFREADING SYSTEM

(75) Inventor: Akira Watanabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 221 days.

(21) Appl. No.: 13/445,715

(22) Filed: Apr. 12, 2012

(65) Prior Publication Data

US 2012/0263345 A1 Oct. 18, 2012

(30) Foreign Application Priority Data

Apr. 13, 2011 (JP) ................. 2011-088891

(51) Int. Cl.
*G06K 9/00* (2006.01)
*G06T 11/60* (2006.01)
*H04N 1/32* (2006.01)
*G06F 17/24* (2006.01)
*H04N 1/00* (2006.01)

(52) U.S. Cl.
CPC ........ *G06T 11/60* (2013.01); *H04N 2201/3273* (2013.01); *H04N 2201/3256* (2013.01); *H04N 1/00145* (2013.01); *H04N 1/00164* (2013.01); *H04N 1/00183* (2013.01); *H04N 1/00204* (2013.01); *H04N 1/00244* (2013.01); *H04N 1/00278* (2013.01); *H04N 1/00419* (2013.01); *H04N 1/0044* (2013.01); *H04N 1/00472* (2013.01); *H04N 1/00973* (2013.01); *H04N 1/32112* (2013.01); *H04N 2201/0039* (2013.01); *H04N 2201/3263* (2013.01); *H04N 2201/3264* (2013.01); *H04N 2201/3266* (2013.01); *H04N 2201/3278* (2013.01); *H04N 2201/3259* (2013.01); *G06F 17/241* (2013.01)

(58) Field of Classification Search
None
See application file for complete search history.

(56) References Cited

U.S. PATENT DOCUMENTS

| 5,555,099 A | * | 9/1996 | Telle ............................. 358/401 |
| 7,536,706 B1 | * | 5/2009 | Sezan et al. .................. 725/113 |
| 7,783,094 B2 | * | 8/2010 | Collins et al. ................ 382/128 |

(Continued)

FOREIGN PATENT DOCUMENTS

| JP | 2002-358532 A | 12/2002 |
| JP | 2003-6188 A | 1/2003 |

OTHER PUBLICATIONS

Serves et al., "Metadata Creation System for Mobile Images," Jun. 6-9, 2004, ACM, MobiSys'04, 36-38.*

*Primary Examiner* — Matthew Bella
*Assistant Examiner* — Jason Heidemann
(74) *Attorney, Agent, or Firm* — Birch, Stewart, Kolasch & Birch, LLP (57) ABSTRACT

A proof information processing apparatus adds a plurality of types of annotative information to a proof image by use of a plurality of input modes for inputting respective different types of annotative information. A proof information processing method is carried out by using the proof information processing apparatus. A recording medium stores a program for performing the functions of the proof information processing apparatus. An electronic proofreading system includes the proof information processing apparatus and a remote server. At least one of input modes including a text input mode, a stylus input mode, a color information input mode, and a speech input mode is selected depending on characteristics of an image in a region of interest which is indicated.

8 Claims, 10 Drawing Sheets

(56) References Cited

U.S. PATENT DOCUMENTS

| | | | |
|---|---|---|---|
| 2001/0040551 A1* | 11/2001 | Yates et al. | 345/156 |
| 2002/0167497 A1* | 11/2002 | Hoekstra et al. | 345/179 |
| 2003/0013073 A1* | 1/2003 | Duncan et al. | 434/317 |
| 2003/0147099 A1* | 8/2003 | Heimendinger et al. | 358/462 |
| 2007/0124507 A1* | 5/2007 | Gurram et al. | 710/1 |
| 2010/0066690 A1* | 3/2010 | Beamish | 345/173 |

* cited by examiner

ANNOTATIVE INFORMATION APPLYING APPARATUS, ANNOTATIVE INFORMATION APPLYING METHOD, RECORDING MEDIUM, AND ELECTRONIC PROOFREADING SYSTEM

CROSS-REFERENCE TO RELATED APPLICATION

This application is based upon and claims the benefit of priority from Japanese Patent Application No. 2011-088891 filed on Apr. 13, 2011, of which the contents are incorporated herein by reference.

BACKGROUND OF THE INVENTION

1. Field of the Invention

The present invention relates to a proof information processing apparatus for adding a plurality of types of annotative information to a proof image by use of a plurality of input modes for inputting respective different types of annotative information, a proof information processing method that is carried out by the proof information processing apparatus, a recording medium, and an electronic proofreading system.

2. Description of the Related Art

In recent years, the printing industry has been seeing the widespread use of electronic proofreading systems capable of achieving a remote proofreading, i.e., omitting the exchange of color proofs by sending proof data generated by print producers such as printing companies or the like and corrective instruction information produced by publishing planners such as print ordering clients or the like, to persons in charge at geographically remote locations via communication lines. Such electronic proofreading systems are expected to become more convenient to use by incorporating a portable information processing apparatus which includes a display unit, a touch panel, and a recording playback mechanism.

For example, Japanese Laid-Open Patent Publication No. 2003-006188 and Japanese Laid-Open Patent Publication No. 2002-358532 disclose methods and apparatus for adding annotative information based on speech inputs. The disclosed speech-based annotation technology is advantageous in that the user does not need to move their hands and fingers and can input much more annotative information in a short period of time than could do with handwriting or typing.

SUMMARY OF THE INVENTION

If homonym errors, i.e., Chinese character errors, are to be pointed out in annotative information using the Japanese language, then since pronunciation differences cannot be identified by speech, corrective instructions contained in the speech-based annotative information cannot accurately be got across to recipients. On the other hand, corrective instructions can accurately be transmitted if they are directly input by handwriting (image inputs) or typing (text inputs), rather than speech inputs. Therefore, various input modes for inputting respective different types of annotative information have different advantages and disadvantages depending on the characteristics of images to be printed and the contents of corrective instructions to be given.

However, according to the methods and apparatus disclosed Japanese Laid-Open Patent Publication No. 2003-006188 and Japanese Laid-Open Patent Publication No. 2002-358532, it is difficult to selectively use a plurality of different input modes. Even if a plurality of different input modes can be selectively used, the proofreading process is not efficient enough as it is time-consuming to select each of the input modes.

It is an object of the present invention to provide a proof information processing apparatus, a proof information processing method, a recording medium, and an electronic proofreading system which make it possible to increase the efficiency of a proofreading process by selectively using a plurality of different input modes.

According to the present invention, there is provided a proof information processing apparatus for adding a plurality of types of annotative information to a proof image by use of a plurality of input modes for inputting respective different types of annotative information.

The proof information processing apparatus includes a region-of-interest indicator for indicating a region of interest in an image area of the proof image, and a mode selector for selecting at least one of the input modes depending on characteristics of an image in the region of interest which is indicated by the region-of-interest indicator.

Since at least one of the input modes is selected depending on the characteristics of the image in the indicated region of interest, it is possible to selectively use the input modes properly, and thus the efficiency of the proofreading processes is increased.

The proof information processing apparatus should preferably further include an input mode determinator for determining one input mode in response to an operation made by the user if the mode selector has selected at least two input modes.

In the input modes, at least two types of annotative information including speech information, text information, image information and color information can be input.

The characteristics of the image should preferably comprise image features obtained according to prescribed calculating processes.

According to the present invention, there is also provided a proof information processing method to be carried out using an apparatus for adding a plurality of types of annotative information to a proof image by use of a plurality of input modes for inputting respective different types of annotative information, comprising the steps of indicating a region of interest in an image area of the proof image, and selecting at least one of the input modes depending on characteristics of an image in the region of interest which is indicated.

According to the present invention, there is further provided a recording medium storing a program therein, the program enabling an apparatus for adding a plurality of types of annotative information to a proof image by use of a plurality of input modes for inputting respective different types of annotative information, to function as a region-of-interest indicator for indicating a region of interest in an image area of the proof image, and a mode selector for selecting at least one of the input modes depending on characteristics of an image in the region of interest which is indicated by the region-of-interest indicator.

According to the present invention, there is still further provided an electronic proofreading system comprising at least one of the proof information processing apparatus described above, and a server for storing proof data representative of the proof image and the annotative information, the server being capable of mutually communicating with the proof information processing apparatus.

With the proof information selecting apparatus, the proof information processing method, the recording medium, and the electronic proofreading system according to the present invention, inasmuch as at least one of the input modes is selected depending on the characteristics of the image in the indicated region of interest, it is possible to selectively use the input modes properly, and thus the efficiency of the proofreading processes is increased.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A proof information processing method according to a preferred embodiment of the present invention in connection with a proof information processing apparatus, a recording medium, and an electronic proofreading system which carry out the proof information processing method will be described in detail below with reference to the accompanying drawings.

Figure 1:
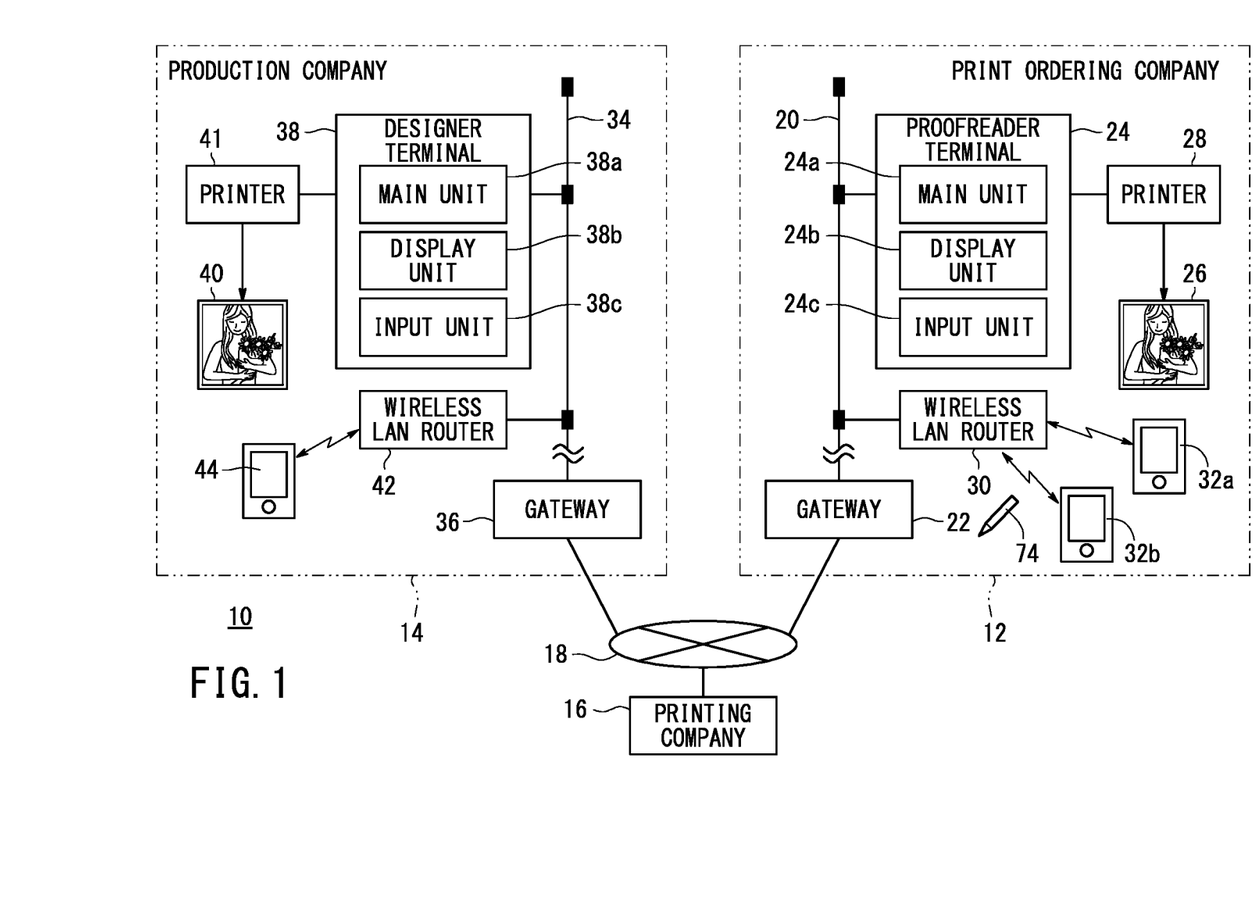
FIG. 1 is a block diagram of the overall configuration of a print production system as an electronic proofreading system according to an embodiment of the present invention.

FIG. 1 shows in block form the overall configuration of a print production system 10 as an electronic proofreading system according to an embodiment of the present invention.

As shown in FIG. 1, the print production system 10 is a system constructed between a plurality of different players, i.e., a print ordering company 12 such as an advertising agency or a client to which a proofreader belongs, a production company 14 to which a designer belongs, and a printing company 16 to which a printing operator belongs, which are interconnected by a network 18 such as a LAN (Local Area Network) or a WAN (Wide Area Network). The players are not limited to the illustrated entities, but may be different players in different combinations. For example, the production company 14 and the printing company 16 may be one company.

The print ordering company 12 includes a gateway 22 interconnecting the network 18 and a LAN 20 in the print ordering company 12, a proofreader terminal 24 for proofreading proof data sent from the printing company 16, a printer 28 for printing a proof 26 based on proof data sent from the proofreader terminal 24, a wireless LAN router 30 serving as a relay device for a wireless LAN constructed in the print ordering company 12, and two information processing apparatus (proofreading information processing apparatus) 32a, 32b capable of acquiring proof data, etc. via the wireless LAN router 30.

Print data which are generated at a first proofreading, a second proofreading and a third proofreading, and also at finishing of a proofreading process will be collectively referred to as "proof data".

The production company 14 includes a gateway 36 interconnecting the network 18 and a LAN 34 in the production company 14, a designer terminal 38 for proofreading proof data sent from the printing company 16, a printer 41 for printing a proof 40 based on proof data sent from the designer terminal 38, a wireless LAN router 42 serving as a relay device for a wireless LAN constructed in the production company 14, and an information processing apparatus (proofreading information processing apparatus) 44 capable of acquiring proof data, etc. via the wireless LAN router 42.

Figure 2:
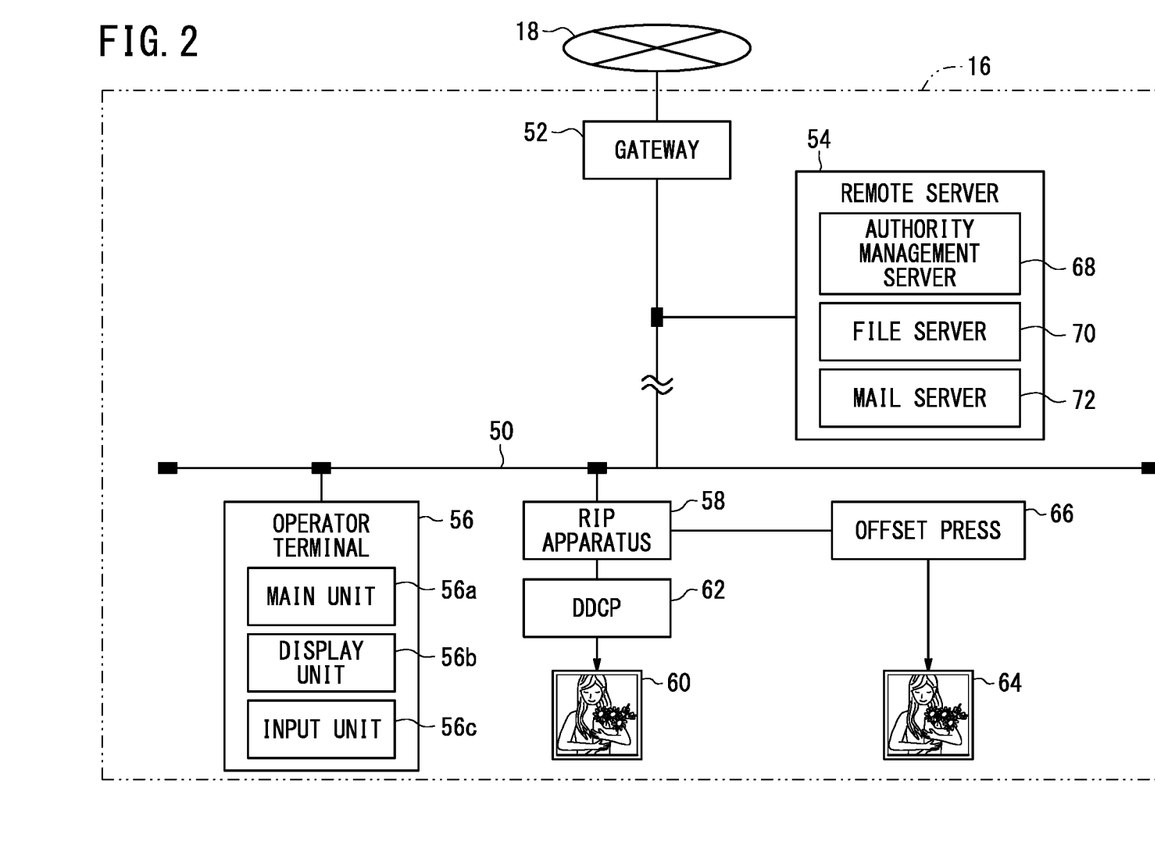
FIG. 2 is a block diagram of the system configuration of a printing company shown in FIG. 1.

FIG. 2 shows in block form the system configuration of the printing company 16 shown in FIG. 1.

As shown in FIG. 2, the printing company 16 includes a gateway 52 interconnecting the network 18 and a LAN 50 in the printing company 16, a remote server (server) 54 that is accessible through the network 18 from terminals belonging to external networks which include the LANs 20, 34, an operator terminal 56 for performing various types of operation required to produce prints, an RIP apparatus 58 for performing various image processing processes including a rasterizing process and a color converting process on proof data or platemaking data sent from the remote server 54, a DDCP (Direct Digital Color Proofing) 62 for printing a proof 60 based on processed proof data sent from the RIP apparatus 58, and an offset press 66 for producing a print 64 with printing plates, not shown, installed therein.

The remote server 54 serves as an apparatus central to the management of a workflow in the print production system 10. The remote server 54 is connected to the proofreader terminal 24, the designer terminal 38, and the information processing apparatus 32a, 32b, 44 through the network 18. The remote server 54 is also connected to the operator terminal 56 and the RIP apparatus 58 through the LAN 50.

According to the present embodiment, the remote server 54 performs a function as an authority management server 68 for managing task authorities that can be exercised by respective terminals, users, or jobs, a function as a file server 70 for storing and transferring material data, proof data, platemaking data, and various data files associated with those data, and a function as a mail server 72 for generating and distributing notice mails at prescribed timings such as the starts and ends of various processes.

The authority management server 68 registers various settings about the operation of the print production system 10 and operates the print production system 10 according to the registered setting information. The registered setting information includes authorities to access the file server 70, authorities to read and write various data from and in the file server 70, destinations of notice mails from the mail server 72, and the like. More specifically, with respect to an electronic proof, to be described later, an authority to see a proof image, an authority to add annotative information to the proof image, an authority to correct and update proof data, an authority to approve the finishing of a proofreading process, and other authorities are assigned to each of persons in charge.

The file server 70 performs a saving process, an updating process, a deleting process, and other processes on various data files required to produce the print 64 according to the registered information in the authority management server 68. The various data files include material data from the production company 14, proof data, platemaking data, job tickets {e.g., JDF (Job Definition Format) files}, ICC (International Color Consortium) profiles, color sample data, etc.

The mail server 72 timely sends notice mails to prescribed terminals (users) according to the registered information in the authority management server 68. The mail server 72 sends notice mails at such timings as a notice of the submission of a manuscript, a notice of the execution of a preflight process, a notice of the start/end of a proofreading process, a notice of the approval of a proofreading process, a notice of the finishing of a proofreading process, etc. The notice mails representing those notices allow the persons in charge to confirm the progress of each process.

The RIP apparatus 58 functions as a print processing server for at least one printing press. In FIG. 2, the RIP apparatus 58 is electrically connected to the DDCP 62 and the offset press 66. The RIP apparatus 58 converts proof data described in a page description language into halftone dot data depending on a printing press to be used, and supplies the halftone dot data to the DDCP 62 or the offset press 66.

The DDCP 62 produces a proof 60 based on the halftone dot data supplied from the RIP apparatus 58. An inkjet color proofer, a low-resolution color laser printer on the electrophotographic principles, an inkjet color printer, or the like may be used as a proofer instead of the DDCP 62.

The offset press 66 produces a print 64 based on the halftone dot data supplied from the RIP apparatus 58. A digital printing press for direct printing, such as an inkjet color proofer, a color laser printer on the electrophotographic principles, or the like, may be used instead of the offset press 66.

As shown in FIGS. 1 and 2, the proofreader terminal 24 and the designer terminal 38, which serve as client apparatus, and the operator terminal 56 have respective main units 24a, 38a, 56a each including a CPU, a ROM, a RAM, etc., respective display units 24b, 38b, 56b, and respective input units 24c, 38c, 56c each including a pointing device, a keyboard, etc.

According to the present embodiment, each of the information processing apparatus 32a, 32b, 44 allows the user to input handwritten information with a stylus pen (stylus) 74 or a user's fingertip.

Figure 3:
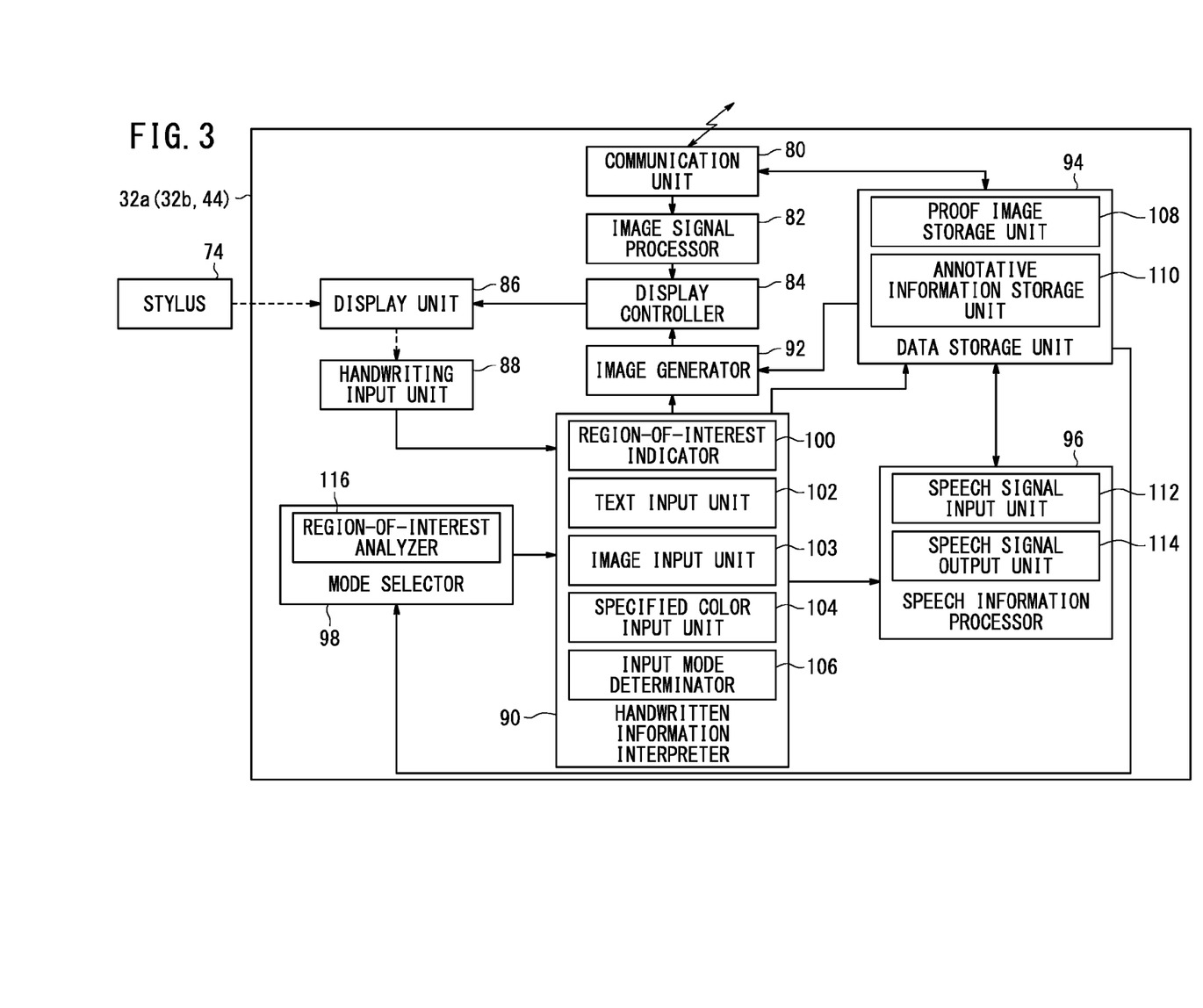
FIG. 3 is a functional block diagram of an information processing apparatus shown in FIG. 1.

FIG. 3 is a functional block diagram of the information processing apparatus 32a shown in FIG. 1. A controller, not shown, including a CPU, etc. reads and executes a program stored in a recording medium, e.g., a data storage unit 94, such as a ROM, a RAM, or the like, thereby to perform functions as shown in FIG. 3. The information processing apparatus 32b, 44 have the same functional configuration as shown FIG. 3.

As shown in FIG. 3, the information processing apparatus 32a includes a communication unit 80 for sending and receiving electric signals to and from an external apparatus, an image signal processor 82 for performing various information processing processes on proof data received from the communication unit 80 to make the proof data suitable for display, a display controller 84 for generating a display control signal from the proof data processed by the image signal processor 82, a display unit 86 for displaying images including proof images and annotative information based on the display control signal generated by the display controller 84, a handwriting input unit 88 for inputting handwritten information by detecting points of contact between the stylus pen 74 and the display unit 86, a handwritten information interpreter 90 for interpreting the handwritten information including user's instructions and input information based on features of the handwritten information from the handwriting input unit 88, an image generator 92 for generating display images including figures, icons, etc. depending on the handwritten information interpreted by the handwritten information interpreter 90, a data storage unit (recording medium) 94 for storing the handwritten information interpreted by the handwritten information interpreter 90, programs, and data, a speech information processor 96 for inputting and outputting speech information as annotative information, and a mode selector 98 for selecting at least one of a plurality of input modes as a recommended mode.

Annotative information includes image information representative of characters, figures, symbols, patterns, colors, or combinations thereof, text information representative of combinations of character codes such as ASCII codes, speech information, color information, video information, etc. According to the present embodiment, there are four input modes available including a text input mode, a stylus input mode, a color information input mode, and a speech input mode. However, the present invention is not limited to the above four input modes, but may employ input modes for inputting at least two types of annotative information selected from speech information, text information, image information, and color information.

The image signal processor 82 perform various signal processing processes including an image scaling process, a trimming process, a gamma converting process, an ICC-profile-based color matching process, an image encoding and decoding process, etc.

The display unit 86, which comprises a display module capable of displaying colors, may be a liquid crystal panel, an organic EL (electroluminescence) panel, an inorganic EL panel, or the like. The handwriting input unit 88 comprises a touch-panel detector which is capable of directly inputting data through the display unit 86. The touch-panel detector may be a resistance film detector, an electrostatic capacitance detector, an infrared detector, an electromagnetic induction detector, an electrostatic coupling detector, or the like.

The handwritten information interpreter 90 includes a region-of-interest indicator 100 for indicating a region of interest 140 (see FIG. 6A) in the image area of a proof image 122 (see FIG. 6A), a text input unit 102 (first input unit) for inputting character information in a text format, an image input unit 103 (second input unit) for inputting character information in an image format, a specified color input unit 104 (third input unit) for inputting information about specified colors, and an input mode determinator 106 for determining one of input modes selected by the mode selector 98.

The data storage unit 94, which comprises a memory such as a RAM or the like, includes a proof image storage unit 108 for storing proof data representative of the proof image 122 and an annotative information storage unit 110 for storing annotative information and temporary data thereof.

The speech information processor 96 has a speech signal input unit 112 (fourth input unit: microphone unit) for inputting speech information from an external source as an electric signal (hereinafter referred to as "speech signal") and a speech signal output unit 114 (speaker unit) for outputting an acquired speech signal. The microphone unit may comprise an electrostatic microphone such as a capacitor microphone or an electret capacitor microphone, a piezoelectric microphone, a carbon microphone, a bone-conduction microphone, an electrodynamic microphone, or the like. The speaker unit may comprise any of various types of speakers including a dynamic speaker which vibrates a vibration plate for generating sound waves. The speech information processor 96 itself may be dispensed with the speech signal input unit 112 and the speech signal output unit 114, and an external microphone and an external speaker may be connected to the speech information processor 96 through connection terminals, not shown.

The mode selector 98 has, in addition to the function to select at least one of the input modes, a region-of-interest analyzer 116 for analyzing features of an image in the region of interest 140 indicated by the region-of-interest indicator 100.

The print production system 10 according to the present embodiment is basically configured as described above. An operation sequence of the print production system 10 which includes a workflow for producing the print 64 will be described in detail below with reference to FIGS. 4 and 5.

Figure 4:
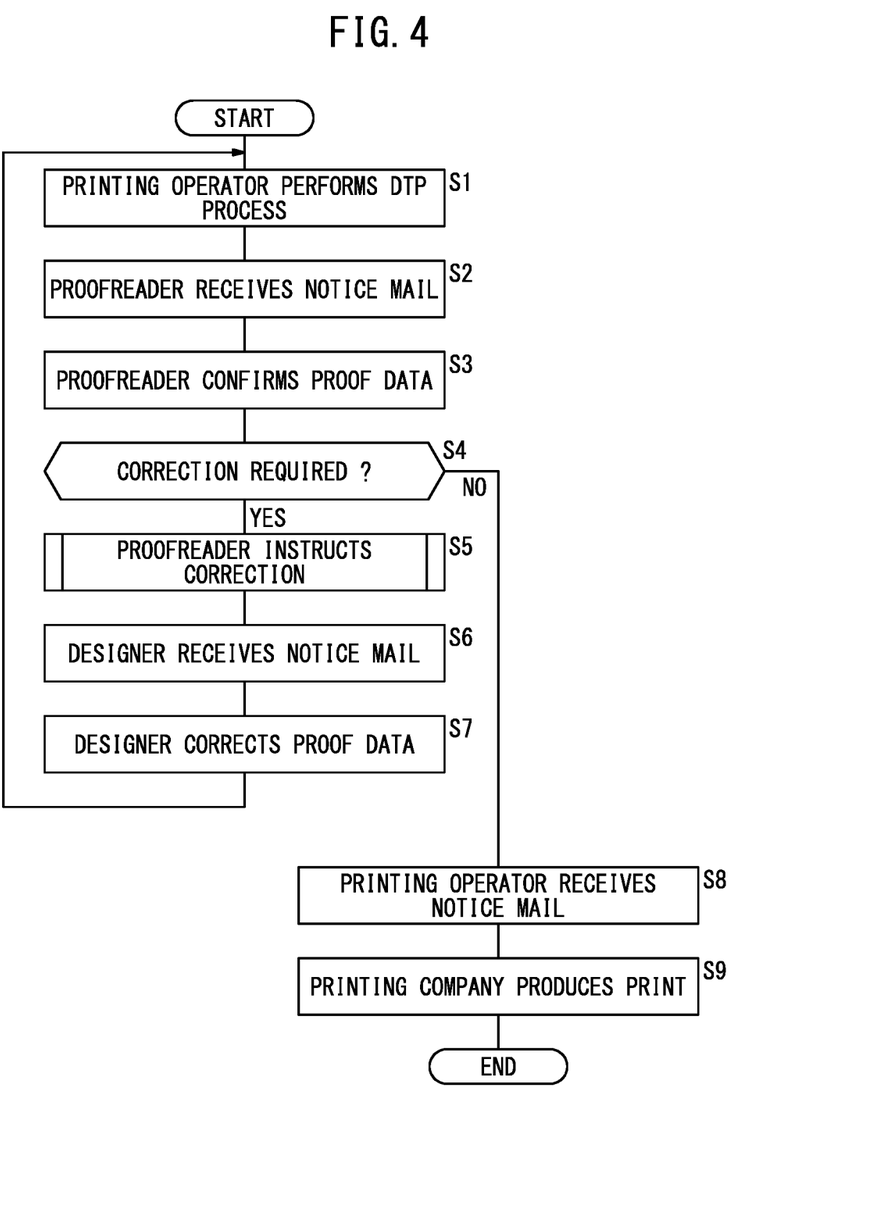
FIG. 4 is a flowchart of a print production sequence carried out by the print production system shown in FIG. 1.

In step S1 shown in FIG. 4, the printing operator belonging to the printing company 16 performs a DTP (DeskTop Publishing) process by editing material data that have been submitted. Prior to the DTP process, the designer belonging to the production company 14 generates material data representing the contents of the print 64, using the designer terminal 38. In response to an instruction from the designer that has an authority to submit material data, to send the material data, the designer terminal 38 selects the file server 70 of the remote server 54 of the printing company 16 as a recipient, and sends the material data to the file server 70. The file server 70 receives the material data via the LAN 34, the gateway 36, the network 18, and the gateway 52, and stores the received material data.

The printing operator obtains the material data, performs a preflight process and other necessary process including a composition, using the operator terminal 56. At this time, the operator terminal 56 may receive data files from and send data files to the file server 70 through the LAN 50.

A proofreader as a user receives a notice mail requesting a proofreading process from the mail server 72 of the remote server 54 in step S2. The proofreader may belong to either one of the print ordering company 12, the production company 14, and the printing company 16. In the present embodiment, the proofreading process is illustrated as being carried out by the proofreader belonging to the print ordering company 12. However, the proofreading process may be carried out by a proofreader belonging to the production company 14 or the printing company 16. The proofreader terminal 24 (main unit 24a) of the print ordering company 12 receives the notice mail from the mail server 72 through the network 18, the gateway 22, and the LAN 20.

Then, the proofreader downloads proof data (first proof data) from the file server 70 and confirms the downloaded proof data in step S3. For example, the proofreader terminal 24, i.e., the main unit 24a thereof, acquires proof data from the printing company 16 via the network 18, etc. and performs a prescribed signal processing process suitable for printing by the printer 28, generating print data. Then, the printer 28 acquires the print data from the main unit 24a, and produces a proof 26 based on the print data. The proofreader observes the proof 26 and performs various proofreading jobs on the proof 26.

Then, the proofreader judges whether the proof data need to be corrected or not in step S4. If the proofreader decides that the proof data need to be corrected, then the proofreader sends a corrective instruction to the designer in step S5. With the print production system 10 according to the present embodiment, annotative information (annotation) added by the proofreader using the information processing apparatus 32a, etc. is registered in the file server 70, whereby the designer who has an authority to see a proof image can see the contents of the corrective instruction. For example, if the proofreader sends an instruction indicating that the proofreader does not approve the contents of the page to the remote server 54, the mail server 72 sends a notice mail to the designer.

The operation of the information processing apparatus 32a to add annotative information in step S5 will be described in detail below with reference to a flowchart shown in FIG. 5 and the functional block diagram shown in FIG. 3.

Figure 5:
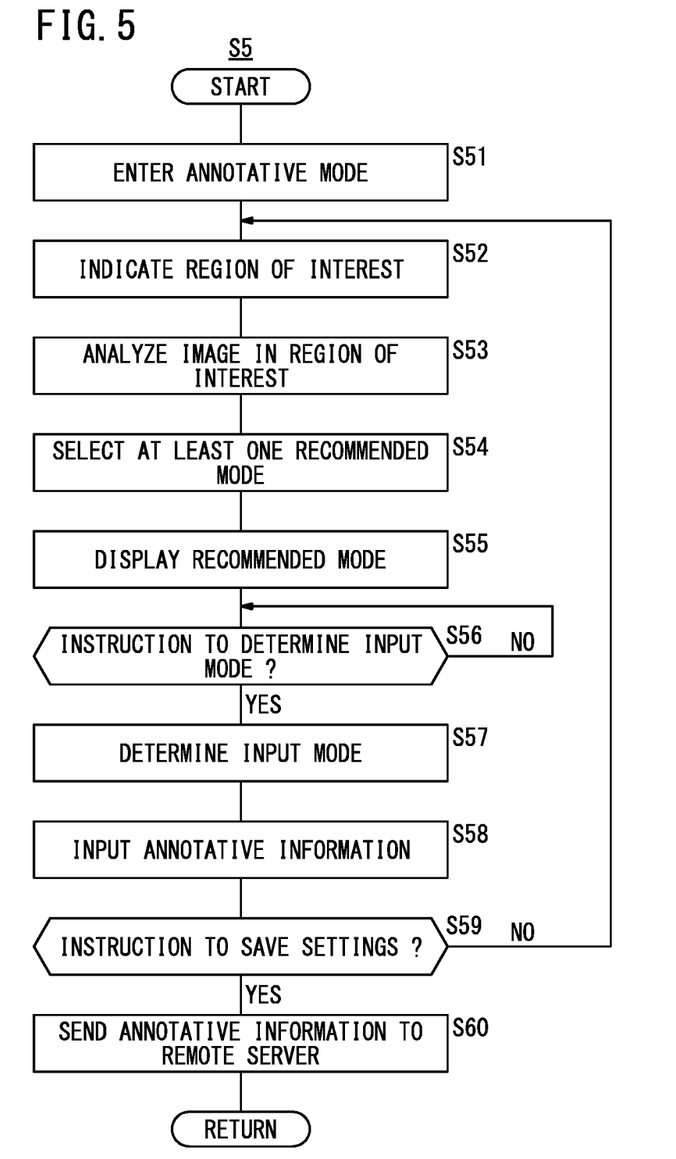
FIG. 5 is a flowchart of an operation sequence of the information processing apparatus, in step S5 of the flowchart shown in FIG. 4.

First, the information processing apparatus 32a enters an annotating mode in response to a prescribed operation made by the proofreader in step S51 shown in FIG. 5. In response to an instruction to download proof data, the communication unit 80 receives proof data from the printing company 16. The image signal processor 82 performs image processing processes on the proof data received from the communication unit 80 to make the proof data suitable for display on the display unit 86. The display controller 84 generates a display control signal from the proof data processed by the image signal processor 82, and controls the display unit 86 to display a proof image 122 on a display screen 120 based on the display control signal.

Figure 6A:
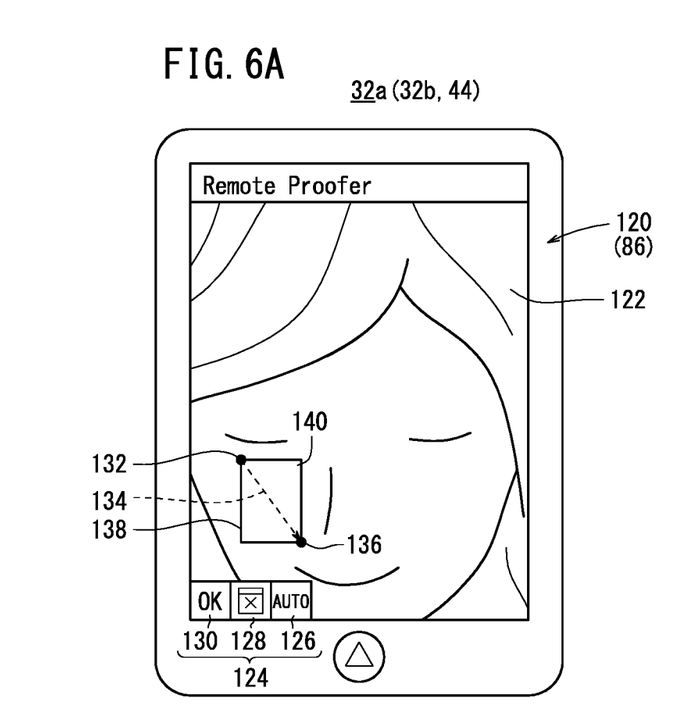
FIGS. 6A and 6B are views showing how a screen image changes in a case where annotative information is added to a proof image.
Figure 6B:
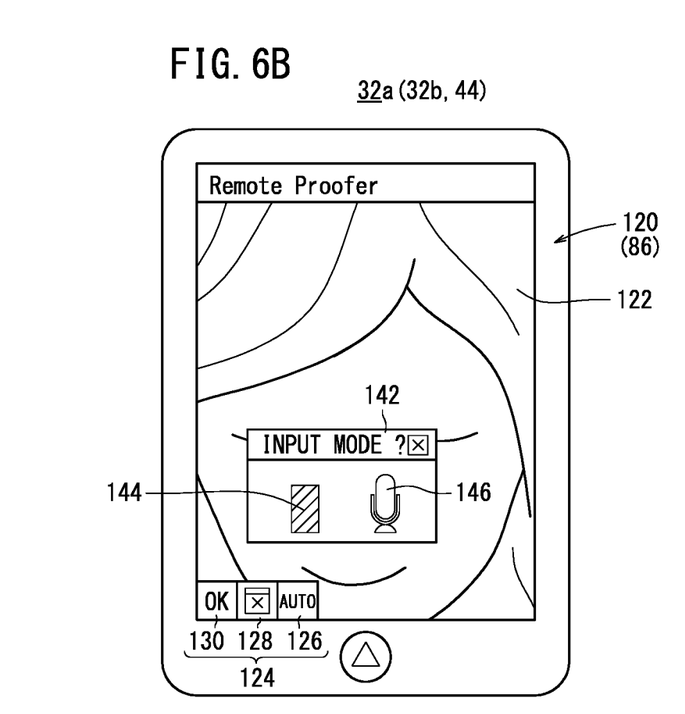

FIGS. 6A and 6B are views showing how a screen image changes in a case where the annotative information is added to the proof image 122.

As shown in FIGS. 6A and 6B, the display screen 120 displays the proof image 122, which shows a female face as viewed in front elevation, almost over its entire area. The display screen 120 also displays a series of icons 124 over the proof image 122 in a lower left corner of the display screen 120. The icons 124 include a first icon 126 which switches between editing modes depending on the number of times it is touched, a second icon 128 which switches between a handwriting mode and an eraser mode by being touched, and a third icon 130 for indicating completion of a proofreading process and saving of settings by being touched. For example, the proofreader makes a certain operation, e.g., touches the first icon 126 a certain number of times, and then an annotative mode, which is illustrated as an automatic selection mode indicated as "AUTO", is selected. If the proofreader makes touches the second icon 128 a certain number of times, then the handwriting mode is selected.

Depending on touching operation with the stylus 74 or a fingertip of the user, the displayed contents on the display unit 86 are updated. The updating of the displayed contents is accomplished by a detecting process by the handwriting input unit 88, an interpreting process by the handwritten information interpreter 90 for interpreting handwritten information, an image generating and updating process by the image generator 92, a display control process by the display controller 84, and an updating and displaying process by the display unit 86.

In response to a prescribed operation made by the proofreader, the region-of-interest indicator 100 indicates a region of interest 140 in step S52. More specifically, as shown in FIG. 6A, the proofreader touches a start position 132 on the display screen 120 with the stylus 74, and then drags the stylus 74 along a path 134 indicated by the broken line to an end position 136 on the display screen 120. Then, the display unit 86 displays a rectangular frame 138 over the proof image 122 on a central left area of the display screen 120. The rectangular frame 138 has a diagonal line represented by the path 134. The rectangular frame 138 encloses an image area corresponding to the region of interest 140 which the proofreader intends to correct.

The handwritten information interpreter 90 interprets that the region of interest 140 has been extracted from the combination of the contents detected by the handwriting input unit 88 and the presently indicated modes, i.e. the annotative mode and the handwriting mode.

Then, the region-of-interest analyzer 116 analyzes the image in the region of interest 140 in step S53. Specifically, the region-of-interest analyzer 116 performs an analyzing process on the image (or various items of information associated therewith) in the region of interest 140 indicated in step S52 to acquire image characteristics, more specifically, image features obtained according to prescribed calculating processes and/or image attributes. The image features include a spatial frequency characteristic, a color distribution, statistic color values which include average values, standard deviation, variance, etc., and correlation with objects, i.e., the degree of coincidence with template images. The image attributes include image types which include documents, CG, illustrations, photographs (portraits, landscapes, etc.), and the like, and additional information such as job tickets, etc.

In the example shown in FIG. 6A, if the female face represented by the proof image 122 is of a yellow race, then a substantially yellow skin color is widely distributed in the region of interest 140 (face). In this case, the region-of-interest analyzer 116 produces an analysis result that the color uniformity in the region of interest 140 is high.

Then, the mode selector 98 selects at least one recommended mode from a plurality of input modes in step S54. More specifically, based on the analysis result that the color uniformity in the region of interest 140 is high, which is obtained as a result of step S53, the mode selector 98 estimates that annotative information to be added to the region of interest 140 is information about a corrective instruction to correct colors. Then, the mode selector 98 selects "color information" and "speech" input modes, for example, as input modes suitable for the corrective instruction to correct colors, i.e., recommended modes. The mode selector 98 may select a plurality of recommended modes or a single recommended mode. A plurality of recommended modes are preferable in that the proofreader is given more choices, and a single recommended mode is preferable in that the proofreader does not need to choose an input mode.

Then, the display controller 84 controls the display unit 86 to displays the types of the recommended modes selected in step S54 on the display screen 120 in step S55.

In the example shown in FIG. 6B, a window 142 is displayed over the proof image 122 in a lower central area of the display screen 120. The window 142 includes a mode icon 144 simulating the shape of a color path and a mode icon 146 simulating the shape of a microphone.

Then, the handwritten information interpreter 90 judges whether it has received an instruction to decide an input mode or not in step S56. More specifically, the handwritten information interpreter 90 judges whether the mode icons 144, 146 are touched or not. If the handwritten information interpreter 90 decides that the mode icons 144, 146 are not touched, then step S56 is looped until the mode icons 144, 146 are touched. If the handwritten information interpreter 90 decides that the mode icons 144, 146 are touched, then control goes to step S57.

In step S57, the input mode determinator 106 determines one of the input modes for annotative information to be added to the region of interest 140, in response to a prescribed operation made by the proofreader. More specifically, if the mode icon 144 (see FIG. 6B) is touched, then the input mode determinator 106 determines the "color information" input mode, and if the mode icon 146 (see FIG. 6B) is touched, then the input mode determinator 106 determines the "speech" input mode.

Depending on the input mode determined in step S57, the information processing apparatus 32a inputs annotative information in step S58. In the "color information" input mode, the specified color input unit 104 inputs color information as annotative information through the handwriting input unit 88. In the "speech" input mode, the speech signal input unit 112 inputs a speech signal as annotative information.

Then, the handwritten information interpreter 90 judges whether it has received an instruction to save settings or not in step S59. More specifically, the handwritten information interpreter 90 judges whether the third icon 130 is touched or not. If the handwritten information interpreter 90 decides that the third icon 130 is not touched, then control goes back to step S52 and repeats steps S52 through S58.

If the handwritten information interpreter 90 decides that the third icon 130 is touched, then the information processing apparatus 32a sends the annotative information to the remote server 54 in step S60. More specifically, the annotative information storage unit 110 temporarily stores, as annotative information, not only positional and size information of the region of interest 140 in the proof image 122, but also the color information or the speech signal.

Then, the information processing apparatus 32a sends the annotative information to a given recipient, i.e., the remote server 54 through the communication unit 80. The remote server 54 receives the annotative information via the wireless LAN router 30, the LAN 20, the gateway 22, the network 18, and the gateway 52. The file server 70 stores therein the annotative information in association with the proof data.

Thus, the proofreader instructs correction electrically (step S5).

In the present embodiment, corrective instructions are input by the inputting process shown in FIGS. 6A and 6B, however the inputting process is not limited in this respect. Corrective instructions may be input in various ways depending on the attributes of the proof image 122, the indicated range of the region of interest 140, the preference of the proofreader, etc.

Figure 7A:
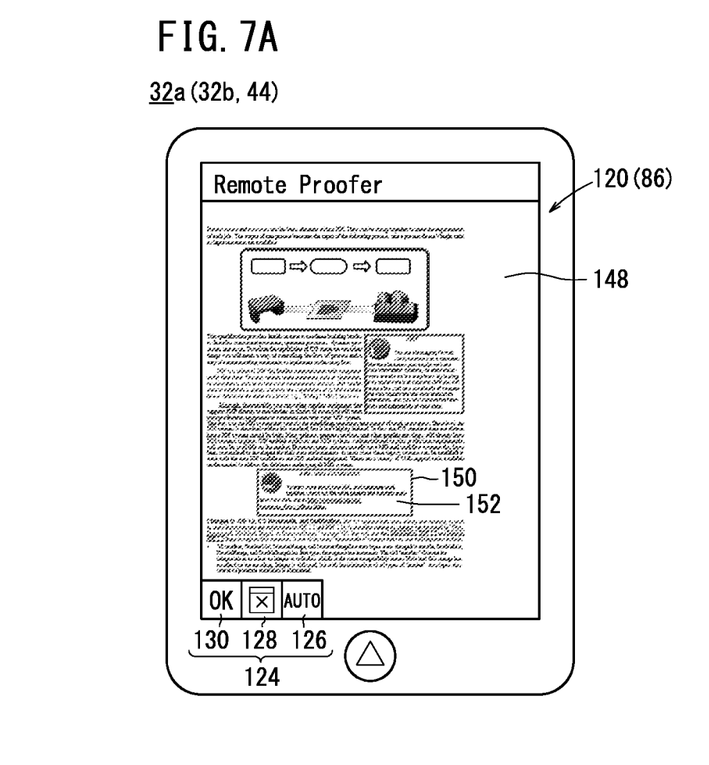
FIGS. 7A and 7B are views showing how a screen image changes in a case where annotative information is added to a proof image.
Figure 7B:
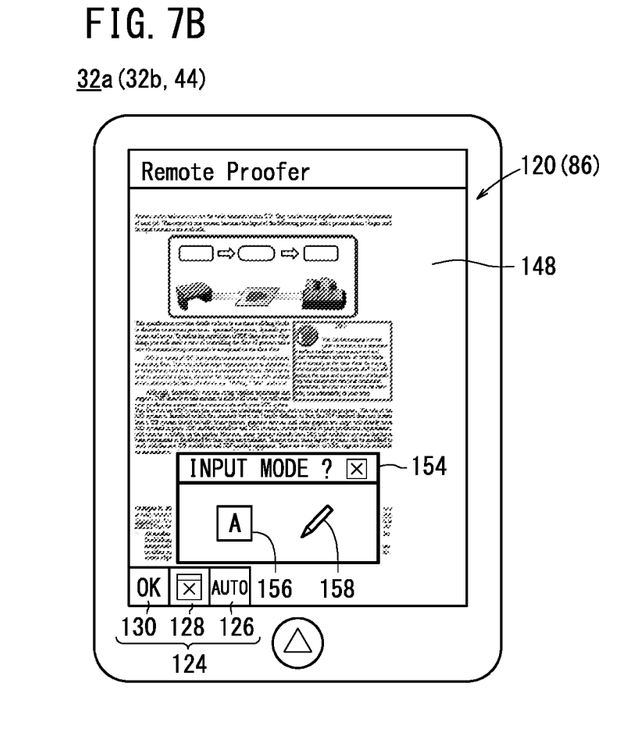

FIGS. 7A and 7B are views showing how a screen image changes in a case where annotative information is added to a proof image 148.

As shown in FIGS. 7A and 7B, the display screen 120 of the display unit 86 displays the proof image 148, which shows a magazine page, almost over its entire area. It is assumed that a region of interest 152 enclosed by a rectangular frame 150 is indicated in step S52. The region of interest 152 includes white color (background) and black color (characters) which are widely distributed therein. In this case, the region-of-interest analyzer 116 produces an analysis result that the region of interest 152 contains a lot of character information (step S53).

The mode selector 98 estimates that annotative information to be added to the region of interest 152 is information about a corrective instruction to correct characters. Then, the mode selector 98 selects "text" and "stylus" input modes, for example, as input modes suitable for the corrective instruction to correct characters, i.e., recommended modes, in step S54.

Thus, as shown in FIG. 7B, a window 154 is displayed over the proof image 148 in a lower central area of the display screen 120 (step S55). The window 154 includes a mode icon 156 marked with "A" and a mode icon 158 simulating the shape of the stylus 74.

In steps S56, S57, if the mode icon 156 is touched, then the "text" input mode is determined, and if the mode icon 158 is touched, then the "stylus" input mode is determined. In the "text" input mode, the text input unit 102 inputs text information as annotative information through the handwriting input unit 88 in step S58. If the "stylus" input mode, then the image input unit 103 inputs image information as annotative information through the handwriting input unit 88 in step S58.

Figure 8:
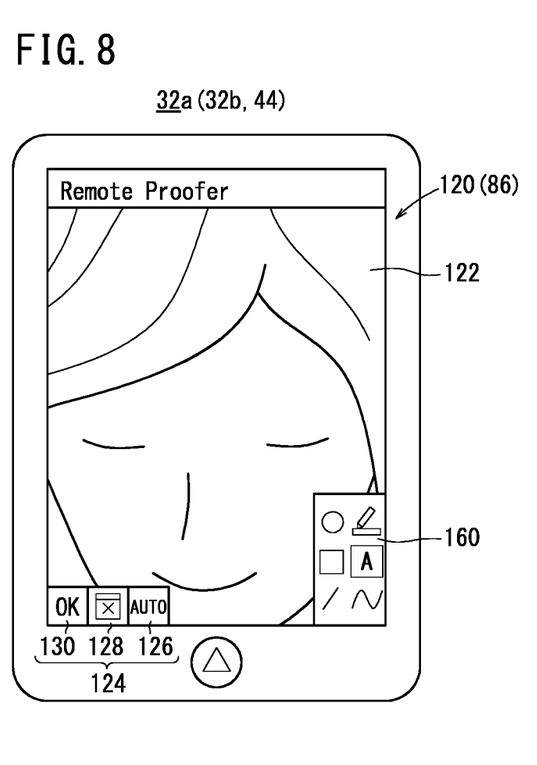
FIG. 8 is a view showing another layout of icons.

The type of an input mode may automatically be determined as described above. Alternatively, the type of an input mode may manually be determined by the proofreader. For example, as shown in FIG. 8, the proofreader may touch the first icon 126 to call up a desired input mode other than the automatic selection mode "AUTO". The icon 124 may be accompanied by a handwriting menu 160, displayed on a lower right corner of the display screen 120, for selecting any of various instructions in the handwriting mode.

In FIG. 4, the designer who belongs to the production company 14 receives a notice mail about a corrective instruction to correct colors from the mail server 72 in step S6. For example, the designer terminal 38, i.e., the main unit 38*a* thereof, receives the notice mail from the mail server 72 through the network 18, the gateway 36, and the LAN 34.

Then, the designer corrects the proof data in step S7. More specifically, the designer sees the proof data together with the annotative information, and confirms the contents of the corrective instruction from the proofreader. The designer may use either the designer terminal 38 or the information processing apparatus 44 in order to see the proof image 122. In the following explanation, the proof image 122 is displayed in the information processing apparatus 44.

Figure 9:
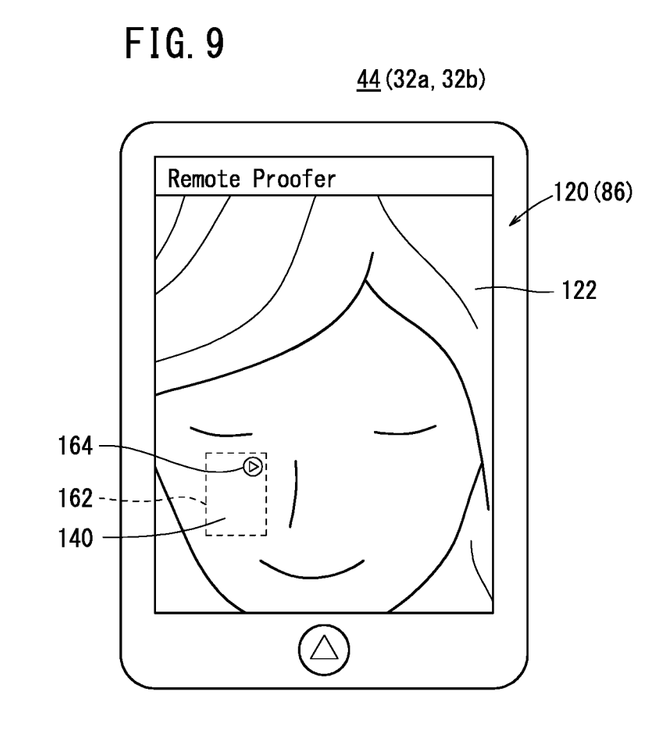
FIG. 9 is a view showing how a screen image changes in a case where a proof image with annotative information is browsed.

As shown in FIG. 9, a broken-line rectangular frame 162, which is in the same position and of the same size as the rectangular frame 138 (see FIG. 6A), is displayed in the position of the region of interest 140 in the proof image 122. A triangular mark 164 is displayed on an upper right corner of the rectangular frame 162. In response to a touching operation of the mark 164, an annotative image 166 (FIG. 10A) representative of the contents of the corrective instruction from the proofreader or a manipulative image 172 (FIG. 10B) is displayed to the right of the region of interest 140.

Figure 10A:
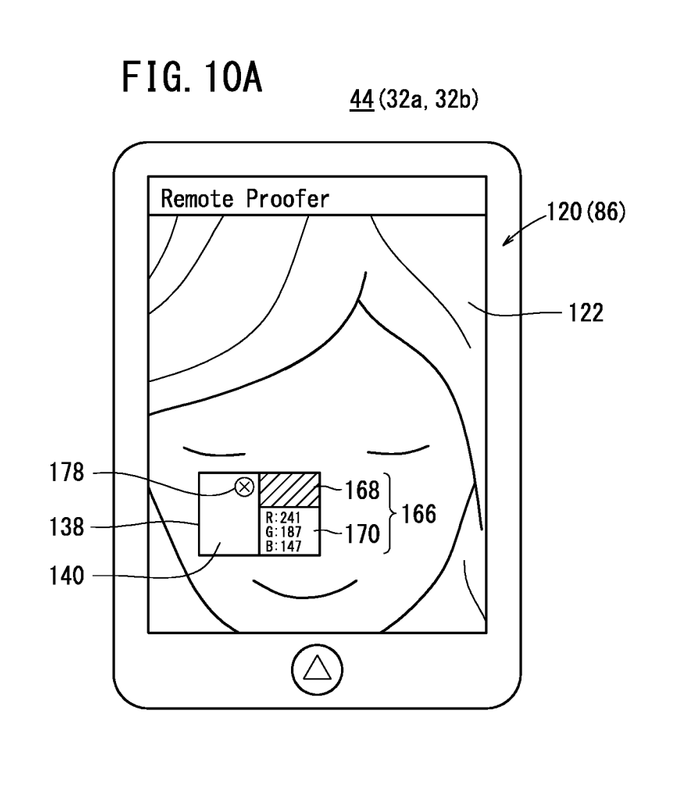
FIGS. 10A and 10B are views each showing how a screen image changes in a case where a proof image with annotative information is browsed.

FIG. 10A shows an example of the annotative image 166 representing annotative information added in the "color information" input mode.

As shown in FIG. 10A, the annotative image 166 includes a color patch 168 colored in a specified color and a color information box 170 displayed below the color patch 168. The color information box 170 contains color information relative to corrective colors (displayed colors of the color patches 168). In the example shown in FIG. 10A, R, G, B color values are shown as the corrective colors. However, the corrective colors are not limited to R, G, B color values, but may be tristimulus values X, Y, Z, device-independent data such as color values L*, a*, b* in a uniform color space, device-dependent data such as color values C, M, Y, K, the name of a manufacturer of color samples, or the numbers of color samples, or the like.

The designer corrects the colors of the proof data using the designer terminal 38, while referring to the color information box 170. This corrective instruction allows the designer to recognize the contents of the corrective instruction with ease because the corrective instruction is more specific and concrete than an abstract instruction indicating, for example, that "the redness of the face should be slightly reduced".

Figure 10B:
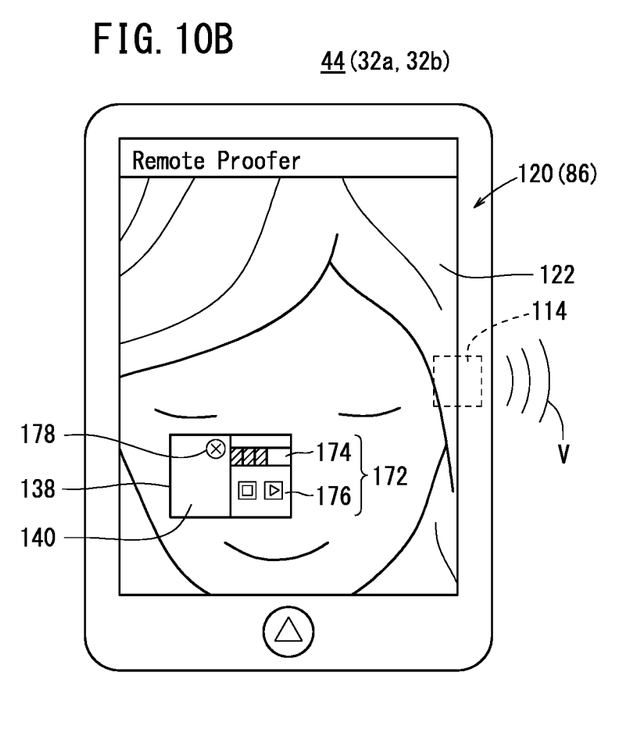

FIG. 10B shows an example of the manipulative image 172 for reproducing sound of annotative information that has been added as speech information in the "speech" input mode.

The manipulative image 172 includes a sound volume gauge 174 for visualizing the sound volume from the speech signal output unit 114 and buttons 176 for playing and stopping speech V output from the speech signal output unit 114. The manipulative image 172 serves to control the speech V from the speech signal output unit 114.

The designer corrects the colors of the proof data using the designer terminal 38, while referring to the speech V. This corrective instruction allows the proofreader to give not only corrective instructions, but also intensions and opinions which tend to be represented by a large amount of information.

In response to a touching operation of a mark 178 (see FIGS. 10A and 10B), the annotative image 166 or the manipulative image 172 disappears, and the display screen 120 changes to the display screen 120 shown in FIG. 9. As the annotative image 166 or the manipulative image 172 is selectively displayed and not displayed, the images can selectively be displayed as needed. The mark 178 for selectively displaying images is useful for the designer especially in a case where there are a plurality of corrective instructions in the proof image 122.

The designer terminal 38 generates proof data with the colors corrected (second proof data), and sends the generated second proof data to the remote server 54. The remote server 54 receives the second proof data through the wireless LAN router 42, the LAN 34, the gateway 36, the network 18, and the gateway 52. The file server 70 stores the received second proof data.

If the correction of the colors by the designer is completed, then control returns to step S1 in which the proofreader receives a notice mail from the mail server 72 of the remote server 54.

Similarly, steps S1 through S7 are repeated to perform second and third proofreading processes. If the proof data are judged as requiring no correction, i.e., if all the proofreaders involved therein send instructions to approve the contents of the page to the remoter server 54, the file server 70 stores the finally updated proof data as proofreading-finished data. Saving of the proofreading-finished data triggers receiving of a notice mail from the mail server 72 by the printing operator belonging to the printing company 16 in step S8. The operator terminal 56, i.e., the main unit 56*a* thereof, receives the notice mail from the mail server 72 through the LAN 50.

Then, the printing operator belonging to the printing company 16 produces the print 64 based on the proofreading-finished data in step S9. More specifically, the printing operator operates the DDCP 62 to produce the proof 60 and proofreads the proof 60. Then, the printing operator produces printing plates, and produces the print 64 on the offset press 66 with the printing plates set thereon.

As described above, since at least one of the input modes which use the text input unit 102, the image input unit 103, the specified color input unit 104, and the speech signal input unit 112, respectively, is selected depending the characteristics of the image in the indicated region of interest 140, 152, it is possible to selectively use the input modes properly, and thus the efficiency of the proofreading processes is increased.

In the illustrated embodiment, each of the client apparatus such as the information processing apparatus 32*a*, etc. comprises an integral combination of a main unit, a display unit, and an input unit. However, each of the client apparatus may comprise a plurality of discrete devices like the main unit 24a, the display unit 24b, and the input unit 24c of the proofreader terminal 24, for example.

Although certain preferred embodiments of the present invention have been shown and described in detail, it should be understood that various changes and modifications may be made therein without departing from the scope of the appended claims.

What is claimed is:

1. An annotative information applying apparatus for adding a plurality of types of annotative information to a proof image by use of a plurality of input modes for inputting respective different types of annotative information, comprising:
   a display unit configured to display the proof image;
   a region-of-interest indicator configured to indicate a region of interest in an image area of the proof image in response to a specific operation made through the display unit;
   a mode selector configured to select at least two of the input modes depending on characteristics of an image in the region of interest which is indicated by the region-of-interest indicator, a number of selected input modes being less than the plurality of input modes;
   an image generator configured to generate display data for at least two mode icons corresponding to the selected input modes selected by the mode selector; and
   an input mode determinator configured to choose one input mode from one of the at least two mode icons displayed by the display unit.

2. The annotative information applying apparatus according to claim 1, wherein, in the input modes, at least two types of annotative information including speech information, text information, image information and color information can be input.

3. The annotative information applying apparatus according to claim 1, wherein the characteristics of the image comprise image features obtained according to prescribed calculating processes.

4. The annotative information applying apparatus according to claim 1, wherein the display unit displays the at least two mode icons within a window displayed over the proof image.

5. The annotative information applying apparatus according to claim 1, wherein the display unit displays the at least two mode icons side-by-side.

6. An annotative information applying method to be carried out using an apparatus for adding a plurality of types of annotative information to a proof image by use of a plurality of input modes for inputting respective different types of annotative information, comprising the steps of:
   displaying the proof image on a display unit;
   indicating a region of interest in an image area of the proof image in response to a specific operation made through the display unit;
   selecting at least two of the input modes depending on characteristics of an image in the region of interest which is indicated, a number of selected input modes being less than the plurality of input modes;
   generating display data for at least two mode icons corresponding to the at least two of the selected input modes; and
   choosing one input mode from one of the at least two mode icons displayed on the display unit.

7. A non-transitory computer readable storage medium storing a program therein, the program enabling an apparatus for adding a plurality of types of annotative information to a proof image by use of a plurality of input modes for inputting respective different types of annotative information, to function as:
   a display unit configured to display the proof image;
   a region-of-interest indicator configured to indicate a region of interest in an image area of the proof image in response to a specific operation made through the display unit;
   a mode selector configured to select at least two of the input modes depending on characteristics of an image in the region of interest which is indicated by the region-of-interest indicator, a number of selected input modes being less than the plurality of input modes;
   an image generator configured to generate display data for at least two mode icons corresponding to the selected input modes selected by the mode selector; and
   an input mode determinator configured to choose one input mode from one of the at least two mode icons displayed by the display unit.

8. An electronic proofreading system comprising:
   at least one proof information processing apparatus for adding a plurality of types of annotative information to a proof image by use of a plurality of input modes for inputting respective different types of annotative information, the proof information processing apparatus comprising:
   a display unit configured to display the proof image;
   a region-of-interest indicator configured to indicate a region of interest in an image area of the proof image in response to a specific operation made through the display unit;
   a mode selector configured to select at least two of the input modes depending on characteristics of an image in the region of interest which is indicated by the region-of-interest indicator, a number of selected input modes being less than the plurality of input modes;
   an image generator configured to generate display data for at least two mode icons corresponding to the selected input modes selected by the mode selector;
   an input mode determinator configured to choose one input mode from one of the at least two mode icons displayed by the display unit; and
   a server for storing proof data representative of the proof image and the annotative information, the server being capable of mutually communicating with the proof information processing apparatus.

\* \* \* \* \*